Patented Jan. 2, 1945

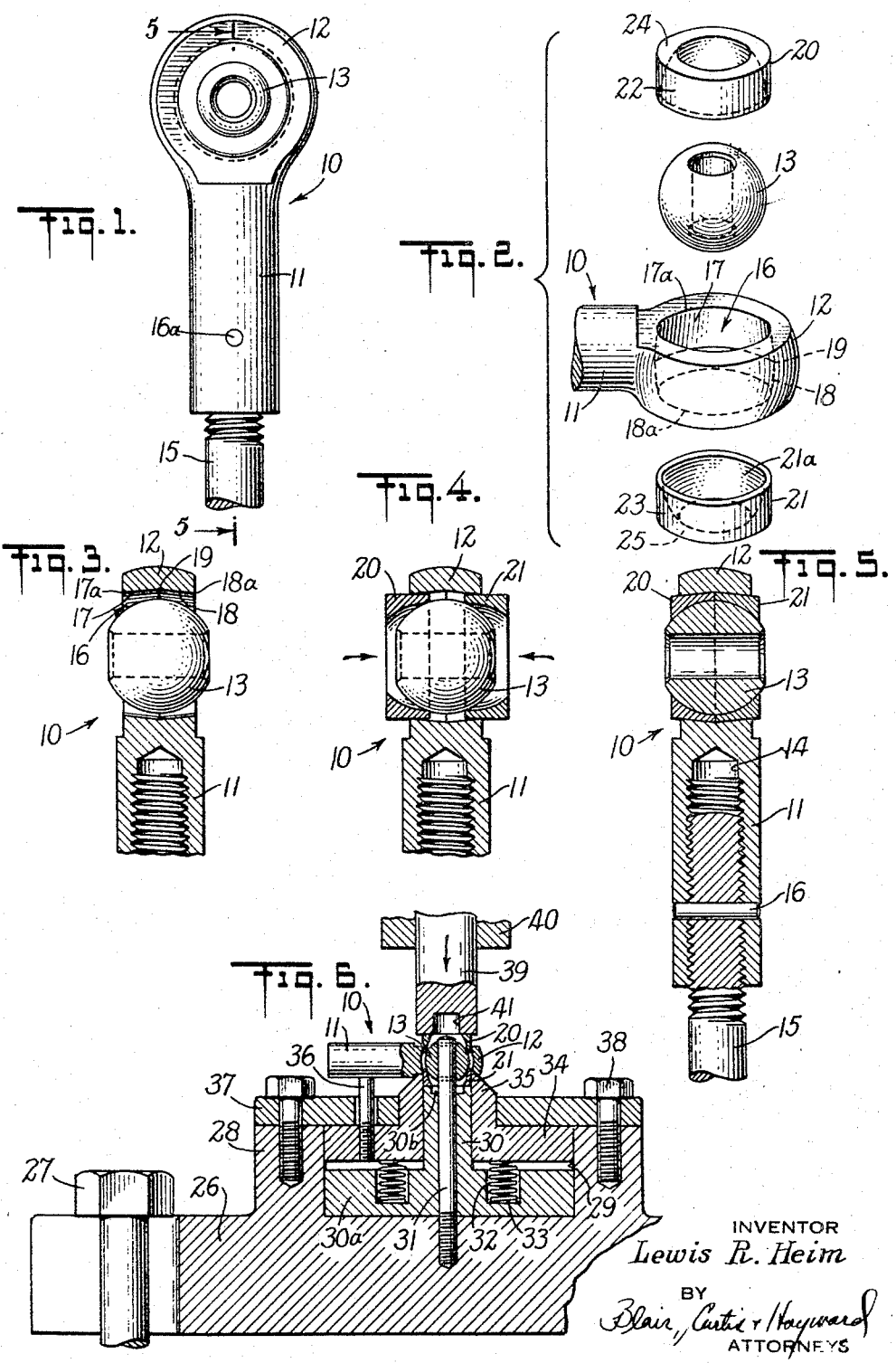

2,366,668

UNITED STATES PATENT OFFICE 2,366,668

METHOD OF MAKING BEARINGS

Lewis R. Heim, Fairfield, Conn., assignor to The Heim Company, Fairfield, Conn., a corporation of Connecticut Application September 29, 1942, Serial No. 460,134

5 Claims. (Cl. 29—149.5)

This invention relates to a rod end bearing and to a method of making the same.

One of the objects of this invention is to provide a method of making a bearing which is inexpensive, simple and sturdy in construction and, though light in weight, capable of extended and rigorous use. Another object is to provide a method of making a rod end bearing of high precision in which the bearing element is capable of relatively substantial universal movement. Another object is to provide a method of making a bearing which is applicable to a large variety of uses.

A still further object of this invention is to provide a method of making a rod end bearing which through its simplicity in practice is amenable to high production requirements. A still further object is to provide such a method through the practice of which the unit cost of the rod end bearing is reduced to a minimum.

Other objects will be in part pointed out and in part apparent hereinafter.

The invention accordingly consists in the several steps and relation and order of each of the same to one or more of the others, all as will be illustratively described herein, and the scope of the application of which will be indicated in the following claims.

In the drawing, wherein I have shown the preferred features of my invention,

Figure 1 is a side view of my bearing attached to a rod or the like;

Figure 2 is a fragmentary exploded perspective view of the several elements of my bearing;

Figure 3 is a fragmentary sectional elevation showing the relationship between the bearing element and body member of my device;

Figure 4 is a fragmentary sectional elevation illustrative of the position of the several parts of my device prior to assembly;

Figure 5 is a sectional elevation taken along the line 5—5 of Figure 1 to show the several parts of the bearing in assembled relation; and, Figure 6 is a fragmentary sectional elevation on a reduced scale of a die-set used in my method of assembly with the bearing parts in position for assembly.

Similar reference characters refer to similar parts throughout the various views of the drawing.

With reference to Figure 1 of the drawing, my rod end bearing comprisess in general a body or eye member generally indicated at 10, formed by a shank 11 and a head 12. Head 12 has rotatably retained therein an apertured ball 13, which is capable of limited universal movement within the head when attached to whatever part or mechanism (not shown) which imparts movement to the ball, or is to be moved by the ball. As shown in Figure 5, shank 12 is drilled and threaded as at 14 so as to threadably receive one end of a rod 15 or the like which may be secured within the shank as by a pin 16 extending through the shank and rod.

As shown in Figures 2 and 3, the head 12 of the body member 10 has a non-cylindrical bore, generally indicated at 16, extending therethrough. Preferably this bore comprises a pair of similar frusto-conical portions 17 and 18, the diameters of the outer edges 17a and 17b of which are less than the diameter at a point 19. Thus, bore 16 might be said to have a double taper, and the purpose of this taper will be pointed out hereinbelow.

Head bore 16 has disposed therein a pair of bushings 20 and 21, the inner surfaces 20a and 21a of which are spherical to form a bearing surface for ball 13 when the ball is positioned with the bushings within head 12. Preferably the body 10 of my bearing is formed of relatively hard steel, while bushings 20 and 21 are formed of a suitable alloy, such as bronze, for example, which is softer than steel and is sufficiently malleable to be pressed into bore 16. Bushings 20 and 21 are cylindrical, as originally formed, and are respectively provided with side walls 22 and 23 and end flanges 24 and 25. As the bearing surfaces of the bushings are spherical, the bushing walls 22 and 23 taper toward their unflanged edges, the resulting thinness of the walls facilitating the installing of the bushings in head 12, as will appear below.

When bushings 20 and 21 are in position within head 12 (Figure 5) they are generally frusto-conical in shape, and their flanges 24 and 25 extend sufficiently around ball 13 to prevent displacement of the ball out of the head. Also, the bushings in assuming their frusto-conical shape during the assembly operation, as will be described, expand to the configuration of the frusto-conical or double tapered bore 16, so that the bushings are firmly locked in the bore by reason of their extremely tight fit with head 12. Preferably the bushings are so dimensioned that when installed, their total width exceeds that of head 12; thus the bushing flanges 24 and 25 lie without the head when the free ends of the bushings abut adjacent diameter 19 of the bore 16.

It may now be seen that ball 13 is rotatably secured within body 10, wherein it is capable of limited universal movement when attached to a part (not shown) which is movable relative to the body member 10. Also, as bushings 20 and 21 assume the tapered or frusto-conical shape, as shown in Figure 5, when they are pressed into head 12, they, in effect, comprise wedges on opposite sides of ball 13 capable of resisting forces tending to displace the ball from its proper operative position.

Although my bearing may be formed in various ways, I prefer the following method: Body or eye member 10 may be turned from suitable bar stock on a screw machine, and thereafter may have the sides of head 12 milled off to the shape shown in Figure 2. Thereafter bore 16 is formed in head 12 by drilling the head, and thereafter boring the hole to the double tapered or frusto-conical shape shown. With the body member of the bearing so formed, ball 13 and bushings 20 and 21 are assembled in the head of the body member by the tool or die-set shown in Figure 6.

This tool may be mounted in a press, and preferably comprises a relatively heavy base 26 which may be fastened to the bed of the press (not shown) as by bolts 27. Base 26 is provided with an annular boss 28 which forms a chamber 29 within which may be disposed the base 30a of a punch 30. This punch is provided with an axial hole through which extends a pilot 31, the lower end of which may be threaded into base 26. Punch base 30a is provided with a number of holes or recesses 32, in which are disposed springs 33, and on which is mounted a support 34, the upper end of which is tapered as at 35 to a sufficiently small diameter to support the head 12 of the body member 10. A rod or post 36 is threaded into support 34 and extends upwardly therefrom through a hole in a cover plate 37 to provide a support for the shank 11 of body member 10. Tapered end 35 of support 34 and post 36 are so dimensioned that when body member 10 is placed thereon, the axis of the body member is horizontal. Cover plate 37 may be secured to annular boss 28 as by screws 38. A complementary punch 39 is provided to fit in the moving part 40 of the press, and the bottom of this punch has a recess 41 into which the upper portion of the ball 13 and the upper end of pilot 31 move during the assembly operation.

To assemble my bearing, bushing 21 is placed on the end of punch 30 in the pocket formed by end 35 of support 34. Next, ball 13 is placed over pilot 34 and seated on bushing 21. Thereafter, body member 10 is mounted in the die-set with its shank 11 resting on rod 36 and one of the machined sides of its head 12 resting on the upper end 35 of support 34. Then the other bushing 20 is positioned on top of ball 13 and slightly inside of bore 16 of the body member. The several parts are now in position for final assembly by operation of the press. When the press is operated, punch 39 is forced downwardly, tending to force bushing 20 into head 12. The downward pressure of punch 39 is resisted by the upward bias of springs 33 in lower punch 30, and when the pressure of the upper punch overcomes the bias of these springs, support 34 is forced downwardly. This permits downward movement of body member 10, and as the body member moves downwardly the lower punch 30 forces bushing 21 into head 12. Springs 33 are so tensioned that upon downward movement of upper punch 39, bushings 20 and 21 are forced into head 12 simultaneously so that their inner ends abut adjacent diameter 19 (Figure 5) of the bore in head 12. To assure that neither of the bushings is pressed into head 12 farther than it should be, the travel of support 34 is limited by the space between cover plate 37 and the top of base 30a of punch 30. It should be noted that the lower punch 30 is also provided with a recess 30b, into which the lower portion of ball 13 may enter as the bushings are pressed into place. Preferably the stroke of the press (not shown) is limited to preclude excessive pressure on the bushings which might tend to force one or the other of them beyond the proper position or cause the bushings to bind the ball. Thus bushings 20 and 21 are pressed into head 12 with equal pressure, and accordingly are symmetrically positioned therewithin.

As pointed out above, the walls of bushings 20 and 21 are tapered so that they may readily be distorted, i. e., the metal of the bushings flows as they are pressed into head 12 so that the bushing walls are expanded by ball 13 to conform to the frusto-conical configuration of their respective bores (as shown in Figure 5). Thus, ball 13 is interlocked in place within head 12.

It should be noted that during the assembly operation, ball 13 is supported with the axis of its hole vertical by reason of the entry of the upper end of pilot 31 into the hole. As bushings 20 and 21 are driven into head 12 and expanded into position by the ball, they may be said to be locked in the head by a forced, or pressed, or driven fit, i. e., there is an extremely tight interlock between the bushings and the head, which precludes their disassembly from the head by any force other than one of greatly abnormal value. Thus ball 13 is wedged within head 12 of the body member, but yet is freely movable therein.

It will now appear that I have provided a method of making a bearing which attains the several objects hereinabove set forth in a thoroughly practical and efficient manner.

As the art herein described might be varied in various particulars, all without departing from the scope of the invention, it is to be understood that all matter hereinbefore set forth or shown in the accompanying drawing is to be interpreted as illustrative and not in a limiting sense.

I claim:

1. The herein described art of making a bearing construction which comprises forming an outer housing member whose bore is outwardly recessed between its ends, forming an inner bearing member with a bearing surface of revolution having the diameter of its cross-section transverse to its axis gradually increasing toward its center from each axial end, inserting said inner member into the bore of said outer member and forcing between said outer member and each end of said inner member to a predetermined axial distance a malleable bushing and thereby expanding said bushings by movement along the increasing diameters of said inner member and forcing them into a form and position in which their outer surface portions are interlocked with the recessed bore of said outer member and their inner surfaces are interlocked with said inner member holding it rotatably against axial movement in said hole.

2. The herein described art of making a bearing construction which comprises forming an outer housing member whose bore is outwardly recessed between its ends, forming an inner bearing member with an axially symmetrical bearing surface of revolution of the diameter of its cross-section transverse to its axis gradually increasing toward its center from each axial end, inserting said inner member into the bore of said outer member, and forcing between said outer member and each end of said inner member to predetermined and equal axial distances a malleable bushing and thereby expanding said bushings and forcing them into a form and position in which their outer portions are interlocked with the recessed bore of said first member and their inner surfaces are interlocked with said inner member holding it rotatably against axial movement in said hole.

3. The herein described art of making a bearing construction which comprises forming in a housing member a hole of inner diameter gradually increasing from each end toward its longitudinal center, forming an inner bearing member having bearing surfaces of revolution the circumference of each of which in planes transverse to its axis increases symmetrically with respect to each other in a direction inwardly from each axial end, inserting said member in said hole and forcing into the space between said members at each end of said hole a malleable bushing and swaging and expanding them to increased diameter by endwise pressure moving them along and in engagement with said inner member into positions and forms in which they are forced outwardly into and interlocked with the inner surface of said hole and remain rotatably interlocked with the outer portions of said inner member.

4. The herein described art of making a universal bearing construction which comprises forming in a housing member a hole having a portion of increasing inner diameter in a direction from an end toward its center, inserting within said hole an inner bearing member having a substantially spherical bearing surface and forcing along and in engagement with said inner member an annular malleable bushing to swage and expand the same by endwise pressure along the surface of increasing diameter of successive transverse cross-sections of said inner member into closely interlocking relation with the inner surface of said hole and with said inner member to hold it free to swing and rotate and locked against outward axial movement toward the end of the hole through which it entered.

5. The herein described art of making a universal bearing construction which comprises forming in a housing member a hole of a diameter gradually increasing from each end toward its longitudinal center, inserting within said hole an inner bearing member having a substantially spherical bearing surface, forming a pair of annular malleable bushings of an inner diameter less than the maximum diameter of said inner member, and swaging and forcing said respective annular members into said hole from each end by endwise pressure to expand each of them to increased diameter by moving them along and in engagement with said inner member and into interlocking relation with the surface of said hole and with the outer ends of said inner member to hold said inner member against axial movement and permit rotation thereof.

LEWIS R. HEIM.